United States Patent
Korolenko

(10) Patent No.: US 7,940,602 B1
(45) Date of Patent: May 10, 2011

(54) REAL-TIME SYSTEM AND METHOD OF UNDERWATER DEPTH DISCREPANCY DETECTION, RECORDATION AND ALARM NOTIFICATION

(75) Inventor: Kyrill V. Korolenko, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 303 days.

(21) Appl. No.: 12/287,155

(22) Filed: Sep. 29, 2008

(51) Int. Cl.
*G01S 15/93* (2006.01)
(52) U.S. Cl. .......................... 367/112; 367/99; 367/909
(58) Field of Classification Search .................... 367/87, 367/99, 112, 909
See application file for complete search history.

(56) References Cited

U.S. PATENT DOCUMENTS

| | | | | | |
|---|---|---|---|---|---|
| 3,223,965 | A | * | 12/1965 | Beebe | 367/112 |
| 3,793,618 | A | * | 2/1974 | Plangger | 367/112 |
| 4,097,836 | A | * | 6/1978 | Riddle et al. | 367/112 |
| 4,409,827 | A | * | 10/1983 | Overs | 73/181 |
| 4,597,069 | A | * | 6/1986 | Milano et al. | 367/95 |
| 5,168,473 | A | * | 12/1992 | Parra | 367/124 |
| 5,400,300 | A | * | 3/1995 | Bick et al. | 367/99 |

FOREIGN PATENT DOCUMENTS

JP  57055412    *  4/1982
JP  57055412 A1 *  4/1982

* cited by examiner

*Primary Examiner* — Ian J Lobo
(74) *Attorney, Agent, or Firm* — James M. Kasischke; Jean-Paul A. Nasser; Michael P. Stanley

(57) ABSTRACT

An underwater depth discrepancy system and method are provided. A comparator compares an actual underwater depth with a predetermined/prerecorded chart depth corresponding to a current location corresponding to the location of the actual underwater depth. A first signal is generated when the actual underwater depth is greater than the chart depth while a second signal is generated when the actual underwater depth is less than the chart depth. The current location and actual underwater depth are recorded whenever the first or second signal is generated. In addition, one or more alarms are generated when the second signal is generated.

19 Claims, 1 Drawing Sheet

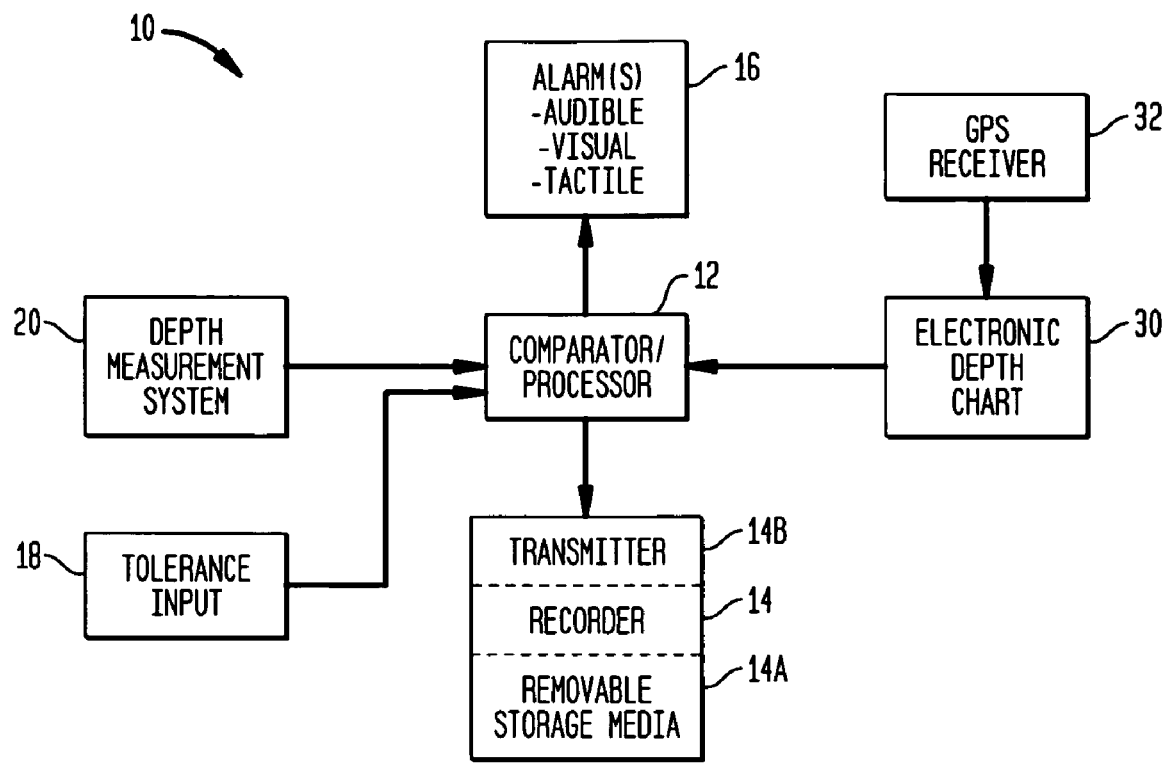

REAL-TIME SYSTEM AND METHOD OF UNDERWATER DEPTH DISCREPANCY DETECTION, RECORDATION AND ALARM NOTIFICATION

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates generally to underwater depth recording, and more particularly to a system and method of performing underwater depth discrepancy detection, recordation and alarm notification in real time.

(2) Description of the Prior Art

Ship personnel use depth charts generated by the National Oceanographic and Atmospheric Administration (NOAA) when navigating through coastal waters. In addition, most ships have an onboard fathometer (e.g., depth sounder) that monitors the depth in real-time. Unfortunately, actual water depths do not always correspond to chart depths. This can be a serious problem if the actual depth is less than the chart depth. Currently, there are no automated systems or procedures in place that can record such discrepancies.

SUMMARY OF THE INVENTION

Accordingly, it is an object of the present invention to provide a system and method that can automatically detect, record, and notify when there is a discrepancy between an actual depth and a charted depth for an underwater location.

Other objects and advantages of the present invention will become more obvious hereinafter in the specification and drawings.

In accordance with the present invention, an underwater depth discrepancy detection, recordation and notification system and method are provided. In terms of a shipboard system, a comparator is coupled to a ship's depth measurement system (DMS) and electronic depth chart system (EDCS). The comparator compares an actual depth (provided by the DMS) with a chart depth corresponding to a current location of the ship (as provided by the EDCS). The comparator generates a first signal when the actual depth is greater than the chart depth. The comparator generates a second signal when the actual depth is less than the chart depth. The current location of the ship and actual depth are recorded whenever the first signal or the second signal is generated. In addition, one or more alarms are generated when the second signal is generated.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

The sole FIGURE is a schematic view of an underwater depth discrepancy system in accordance with the present invention.

DETAILED DESCRIPTION OF THE INVENTION

Referring now to the drawing, a system for detecting, recording and notifying of an underwater depth discrepancy is shown and is referenced generally by numeral 10. System 10 can be incorporated onboard any private, commercial or military ship. System 10 can include all of the illustrated elements or a portion thereof depending on the existing capabilities of a ship as will be explained further below.

At a minimum, depth discrepancy system 10 includes a comparator/processor 12, a recorder 14, and alarm(s) 16. Comparator/processor 12 is any conventional processing device capable of performing a real-time comparison between a current actual depth and a pre-recorded chart depth of the same location, and then generating a result of such comparison. Such comparators/processors are well known in the art. The current actual depth will be measured by an onboard depth measurement system 20 (e.g., depth sounder), the choice of which is not a limitation of the present invention. Since most ships have an existing depth measurement system, depth discrepancy system 10 could be coupled to an existing system 20 or could include system 20 without departing from the scope of the present invention.

The pre-recorded chart depth is provided in an electronic form suitable for comparison with the actual depth measured by system 20. More specifically, an electronic depth chart 30 provides a database of pre-recorded depth data indexed to geographic position (e.g., Global Positioning System or GPS data). The particular pre-recorded chart depth data from chart 30 (that is then provided to comparator/processor 12) is "pointed to" by "own ship" GPS position data determined by a GPS receiver 32. Since a ship may already have an electronic depth chart 30 and GPS receiver 32, depth discrepancy system 10 could be coupled to existing components or could include electronic depth chart 30 and GPS receiver 32 without departing from the scope of the present invention.

In operation, comparator/processor 12 performs real-time comparisons between the actual depth (measured by system 20) and the pre-recorded depth (provided by chart 30) corresponding to the geographic location of the actual depth. If the two depths are equal, nothing happens and comparator/processor 12 awaits the next comparison. Since some level of discrepancy between the actual and pre-recorded depth might be acceptable, comparator/processor 12 can be provided with a tolerance parameter that specifies a range of acceptable discrepancy. The tolerance parameter can be pre-set or stored by comparator/processor 12, or it can be manually provided thereto by a tolerance input 18. By allowing the tolerance parameter to be adjusted, system 10 can be configured for coastal operation where the tolerance may be lower or open-sea operation where the tolerance may be higher.

If the actual depth and pre-recorded depth do not "match" (e.g., as defined by the tolerance parameter), comparator/processor 12 triggers recorder 14 to record the actual depth and the current geographic position thereof (e.g., the ship's current GPS location and time of date determined by GPS receiver 32). This will occur if the actual depth is greater or less than the pre-recorded depth. Recorder 14 includes some form of removable data storage media 14A (e.g., floppy drive, CD, flash drive, etc.) that can be readily delivered to one or more organizations that produce and maintain electronic depth chart 30. In addition or alternatively, recorder 14 could be coupled to a transmitter 14B capable of wirelessly transmitting the actual depth and location thereof to the relevant organization(s) when a discrepancy is detected. Either way, the pre-recorded data can be updated to current conditions by the responsible organization(s).

In cases where the actual depth is less than the pre-recorded depth, comparator/processor 12 will also trigger alarm 16 that can be realized by one or more shipboard alarms. The alarms(s) could be audible (e.g., beeps, siren, etc.), visual (e.g., flashing lights, color change on computer screen, etc.), and/or tactile (e.g., vibrations delivered to shipboard controls continuously manned by personnel). The choice of number and type of alarms used are not limitations of the present invention.

The advantages of the present invention are numerous. Errors in pre-recorded depth data due to mistakes, technical errors, changing underwater conditions, etc., will be detected and automatically recorded in an accurate fashion so that the organizations charged with maintaining such depth data can update same. Further, shipboard operators will be notified of a depth discrepancy indicative of a potential grounding condition when an actual depth is less than the pre-recorded depth. Still further, since crowded coastal regions pose the greatest risk in the terms of a "grounding" incident, the present invention exploits existing private, commercial and/or military traffic to keep pre-recorded depth data current.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An underwater depth discrepancy system, comprising:
   a comparator adapted to be coupled to a ship's depth measurement system (DMS) and electronic depth chart system (EDCS), said comparator comparing an actual depth as provided by said DMS with a chart depth corresponding to a current location of the ship as provided by said EDCS, said comparator generating one of (i) a first signal when said actual depth is greater than said chart depth, and (ii) a second signal when said actual depth is less than said chart depth;
   recording means coupled to said comparator for recording the current location of the ship and said actual depth whenever one of said first signal and said second signal is generated; and
   alarm means coupled to said comparator for generating at least one alarm notification when said second signal is generated.

2. An underwater depth discrepancy system as in claim 1 wherein the current location of the ship is a Global Positioning System (GPS) location that includes time of day.

3. An underwater depth discrepancy system as in claim 1 wherein said comparator is further provided with a tolerance parameter, and wherein one of said first signal and said second signal is generated only when a difference between said actual depth and said chart depth exceeds said tolerance parameter.

4. An underwater depth discrepancy system as in claim 3 further comprising an input device coupled to said comparator for facilitating user selection of said tolerance parameter.

5. An underwater depth discrepancy system as in claim 1 wherein said recording means includes at least one removable data storage media.

6. An underwater depth discrepancy system as in claim 1 further comprising transmission means coupled to said recording means for wirelessly transmitting the current location of the ship and said actual depth so-recorded.

7. An underwater depth discrepancy system as in claim 1 wherein said alarm means comprises at least one of a visual alarm, an audible alarm, and a tactile alarm.

8. An underwater depth discrepancy system, comprising:
   a depth measurement system (DMS) for measuring an actual depth of a water column beneath said DMS at a current location thereof;
   an electronic depth chart system (EDCS) for storing pre-determined chart depths and corresponding locations thereof;
   a comparator coupled to said DMS and said EDCS, said comparator comparing said actual depth with one of said chart depths corresponding to the current location, said comparator generating one of (i) a first signal when said actual depth is greater than said chart depth, and (ii) a second signal when said actual depth is less than said chart depth;
   recording means coupled to said comparator for recording the current location of the ship and said actual depth whenever one of said first signal and said second signal is generated; and
   alarm means coupled to said comparator for generating at least one alarm notification when said second signal is generated.

9. An underwater depth discrepancy system as in claim 8 further comprising a Global Positioning System (GPS) for determining the current location and time of day.

10. An underwater depth discrepancy system as in claim 8 wherein said comparator is further provided with a tolerance parameter, and wherein one of said first signal and said second signal is generated only when a difference between said actual depth and said one of said chart depths exceeds said tolerance parameter.

11. An underwater depth discrepancy system as in claim 10 further comprising an input device coupled to said comparator for facilitating user selection of said tolerance parameter.

12. An underwater depth discrepancy system as in claim 8 wherein said recording means includes at least one removable data storage media.

13. An underwater depth discrepancy system as in claim 8 further comprising transmission means coupled to said recording means for wirelessly transmitting the current location and said actual depth so-recorded.

14. An underwater depth discrepancy system as in claim 8 wherein said alarm means comprises at least one of a visual alarm, an audible alarm, and a tactile alarm.

15. A method of underwater depth discrepancy detection, recordation and notification, comprising the steps of:
   comparing an actual water depth beneath a ship at a current location thereof with a chart depth corresponding to the current location of the ship;
   generating a first signal when said actual water depth is greater than said chart depth;
   generating a second signal when said actual water depth is less than said chart depth;
   recording the current location of the ship and said actual water depth whenever one of said first signal and said second signal is generated; and
   generating at least one alarm notification when said second signal is generated.

16. A method according to claim 15 further comprising the step of providing a tolerance parameter, and wherein one of said first signal and said second signal is generated only when a difference between said actual water depth and said chart depth exceeds said tolerance parameter.

17. A method according to claim 15 wherein said step of recording comprises the step of storing the current location of the ship and said actual water depth on at least one removable data storage media.

18. A method according to claim 15 further comprising the step of wirelessly transmitting the current location of the ship and said actual water depth so-recorded.

19. A method according to claim 15 wherein said step of generating comprises the step of generating at least one of a visual alarm, an audible alarm, and a tactile alarm.

* * * * *